(12) United States Patent
Hohnstein

(10) Patent No.: US 11,207,618 B2
(45) Date of Patent: Dec. 28, 2021

(54) PORTABLE LUBRICANT FILTRATION TOOL AND METHODS OF USE

(71) Applicant: Rocky Mountain Filtration Solutions, Inc., Brighton, CO (US)

(72) Inventor: Scott Lee Hohnstein, Brighton, CO (US)

(73) Assignee: Rocky Mountain Filtration Solutions, Inc., Brighton, CO (US)

(*) Notice: Subject to any disclaimer, the term of this patent is extended or adjusted under 35 U.S.C. 154(b) by 0 days.

(21) Appl. No.: 16/547,105

(22) Filed: Aug. 21, 2019

(65) Prior Publication Data

US 2020/0061500 A1 Feb. 27, 2020

Related U.S. Application Data

(60) Provisional application No. 62/720,425, filed on Aug. 21, 2018.

(51) Int. Cl.
| | |
|---|---|
| *B01D 35/00* | (2006.01) |
| *B01D 29/56* | (2006.01) |
| *B01D 29/60* | (2006.01) |
| *F16N 39/06* | (2006.01) |
| *F16N 39/04* | (2006.01) |
| *F16N 39/02* | (2006.01) |

(52) U.S. Cl.
CPC .......... *B01D 35/005* (2013.01); *B01D 29/56* (2013.01); *B01D 29/601* (2013.01); *B01D 29/608* (2013.01); *F16N 39/02* (2013.01); *F16N 39/04* (2013.01); *F16N 39/06* (2013.01); *F16N 2200/04* (2013.01); *F16N 2200/10* (2013.01); *F16N 2230/02* (2013.01); *F16N 2250/08* (2013.01); *F16N 2250/50* (2013.01); *F16N 2270/70* (2013.01)

(58) Field of Classification Search
None
See application file for complete search history.

(56) References Cited

U.S. PATENT DOCUMENTS

| | | | | |
|---|---|---|---|---|
| 6,064,480 | A * | 5/2000 | Mountain | G01N 15/0227 356/330 |
| 2013/0327719 | A1* | 12/2013 | Van Ee | B01D 35/005 210/742 |

(Continued)

*Primary Examiner* — Richard C Gurtowski
(74) *Attorney, Agent, or Firm* — James A. Sheridan; Sheridan Law, LLC

(57) ABSTRACT

There is disclosed a tool for filtering a lubricant to meet a target ISO cleanliness code. The tool includes a skid-mounted integrated filtration system having a pump that circulates a flow of lubricant from an inlet port, through a heater, through a series of specifically sized filters, and past a digital particle counter. The filtration system also includes a user interface and a programmable logic controller (PLC) configured to track outputs from the pump, the oil heater, and the particle counter to monitor a cleanliness of the circulating lubricant. The filtration system also includes a filtration operations server in communication with the PLC and configured to implement a tracking and monitoring software application enabling control of the filtration system from the system itself or remotely through one or more remote user terminals such as a smartphone, a laptop or tablet computer, and the like. Other embodiments are disclosed.

20 Claims, 15 Drawing Sheets

(56) References Cited

U.S. PATENT DOCUMENTS

2015/0083655 A1* 3/2015 Morishita .............. C10G 53/16
  210/266
2016/0327045 A1* 11/2016 Coeckelbergs ..... F04C 29/0014
2017/0102308 A1* 4/2017 Gillette, II ............. F01M 11/10

* cited by examiner

|  | Y | M | D | WD | Hr | Min | Sec | Error | Error Code | Description |
|---|---|---|---|---|---|---|---|---|---|---|
|  | 2014 | 6 | 10 | 3 | 10 | 16 | 0 | 0 | 0000 | No Error |
|  | 2014 | 6 | 10 | 3 | 10 | 29 | 16 | 0 | 8080 | Error In Data |
|  |  |  |  |  |  |  |  |  | 8081 | Error In Time |

Adjusted Time and Date:
System Time and Date:

Set Time And Date

HMI Time and Date: 6/10/2014 10:29:23 AM
PLC Time and Date: 6/10/2014 10:29:17 AM
Skid Serial No: skid no Year: 1970 to 2554
Month: 1 to 12
Day: 1 to 31
Weekday: 1(Sun) to 7(Sat)
Hour: 0 to 23
Minute: 0 to 59
Second: 0 to 59

Key

*To enter information; simply touch the screen at the desired field location, a keyboard will pop up on the screen allowing you to type.*

Setup | Notes | Trends | Alarm History | Reports | Main

Automated Entry ⓘ
☑

Request Status
Submitted to Lab

Certification Request ID
787203R T5-2018621164614

Marketer
DAL CHEM, INC.

Marketer Location
DAL CHEM, INC.

Technician
 Tony Contreras

Technician Email
cassie@atexisoil.com

Technician Phone
951-279-9830

Customer Number
7555834

Filter Type 1
5um

Filter Type 2
5um

Filter Type 3
5um

Filter Type 4
5um

Hour Meter
14,423.64

Life Total
143,470.50

ISOCLEAN Product
Chevron Rando HD 32 - ISOCLEAN Certified

Equipment ID
C15040119

Batch Code
787203R T5

Batch Code
6/21/2018 9:46 AM

Filtered Date
6/21/2018 9:46 AM

Volume
330,000000

Volume Type
Gallons

Start ISO ⓘ
18/16/12

Target ISO ⓘ
16/14/12

End ISO ⓘ
16/14/11

Shipping Carrier

Tracking Number

Start Time
9:46:14

Total Process Time
1:59:25

Batch Total
3,580.15

Total Cycle
10.85 

Flow Rate Average
29.93

Temperature Start
117.00

Temperature Average
108.9 

FIG. 14

PORTABLE LUBRICANT FILTRATION TOOL AND METHODS OF USE

REFERENCE TO PENDING PRIOR PATENT APPLICATIONS

This application claims the benefit under 35 U.S.C. 119 (e) of U.S. Provisional Patent Application No. 62/720,425, filed Aug. 21, 2018 by Scott Lee Hohnstein for "PORTABLE LUBRICANT FILTRATION TOOL AND METHODS OF USE," which patent application is hereby incorporated herein by reference.

BACKGROUND

Lubricant contamination, including the debris resulting from wear, assembly, dust in the air, and/or any other contaminant that can break loose and be swept into the fluid stream of a lubricant, is a major cause of failure in fluid power systems. To avoid such failures and ensure that a piece of equipment or component realizes its expected life, the original equipment manufacturer (OEM) of nearly every piece of equipment or component provides a target ISO cleanliness code specification for that system to guide how clean the fluid should be for that particular system. The target ISO cleanliness code specification quantifies a maximum particulate contamination level expected per milliliter of lubricant fluid.

Oil filtration systems are designed to remove contamination from lubricants such as motor oils, hydraulic oil, gear oil, fuel oil, and so on, to meet OEM targeted ISO cleanliness code specifications. Existing filtration systems used to meet the target cleanliness levels include kidney loop filtration systems having a motor, a pump, and a filter placed on an oil storage tank or other storage container. Such systems are costly and oftentimes neither maintained nor monitored, resulting in oil that may be filtered too long and allow for the removal of vital additives from the oil. Conversely, rarely do such systems provide sufficient dwell time within each storage tank to allow the filtration to be effective. Moreover, a separate kidney loop filtration system is required for each storage container to prevent oil co-mingling and contamination.

Other existing filtration systems are installed in line within the equipment or component and involve pumping the oil through filters a single time, which is insufficient to achieve the requisite oil cleanliness.

Existing filtration systems of varying types oftentimes utilize filters having an incorrect micron size, which can either filter additives out of the oil (micron size is too small) and damage the lubricant or, alternatively, fail to clean the oil (micron size is too large) to achieve the target ISO cleanliness code. In addition, existing filtration systems do not heat the oil, which is a necessary component for achieving the targeted ISO cleanliness code specification. Nor do existing systems incorporate any type of testing and data monitoring to guarantee that the target ISO cleanliness code specification has been achieved.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

One embodiment provides a portable lubricant filtration tool which may include an integrated filtration system mounted upon a skid, the integrated filtration system comprising: (a) an inlet port; (b) an outlet port; (c) a pump configured to circulate a flow of lubricant into the inlet port, through an oil heater, through a series of filters, in view of a digital particle counter, and out of the outlet port; (d) a filtration system terminal comprising a user interface and a programmable logic controller (PLC) configured to track a plurality of outputs from the pump, the oil heater, and the digital particle counter; and (e) a data logging and record keeping system, comprising: (i) a filtration operations server operating one or more operations processors in communication with the PLC; (ii) a filtration database and a lubricant cleanliness database; and (iii) a management engine running on the filtration operations server, the management engine implementing a filtration data tracking and monitoring application for controlling the integrated filtration system.

In another embodiment, there is disclosed a method for integrative filtering of a lubricant from a source container, and which may comprise attaching the source container to an inlet port and pumping the lubricant from the source container into the inlet port. The method may further comprise heating the lubricant with an oil heater and filtering the heated lubricant using one or more Micron filters. The method may further comprise counting with a digital particle counter a level of particle contamination in the filtered lubricant. The method may further comprise tracking the level of particle contamination and recording a number of passes through the one or more Micron filters using a filtration operations server. The method may further comprise comparing the level of particle contamination to a lubricant cleanliness database communicating with the filtration operations server, and may comprise continuing circulating the lubricant until a lubricant cleanliness target within the cleanliness database has been achieved. The method may further comprise initiating a shutdown of the circulation wherein the pump is turned off, and delaying the shutdown by a threshold if a portion of lubricant within the oil heater is expected to overheat. The delayed shutdown may comprise 1) turning off electrical power to the oil heater, 2) sensing a lubricant temperature or a cooling time, and 3) turning off the pump when one of the lubricant temperature has dropped below a threshold temperature and the cooling time has exceeded a threshold time.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which:

FIGS. 8-9 present interactive and preconfigured screens illustrating setup of and data entry into the integrated filtration system as displayed by a graphical user interface (GUI) module of the data tracking and monitoring software of FIG. 5.

FIGS. 11-13 illustrate a plurality of interactive and preconfigured screens addressing trends for the batch in process, alarms history, and process reports for past batches, as displayed by the graphical user interface (GUI) module of the data tracking and monitoring software of FIG. 5, in an embodiment.

FIG. 14 presents a process report generated by the graphical user interface (GUI) module of the data tracking and monitoring software of FIG. 5, in an embodiment.

DETAILED DESCRIPTION

Figure 1:
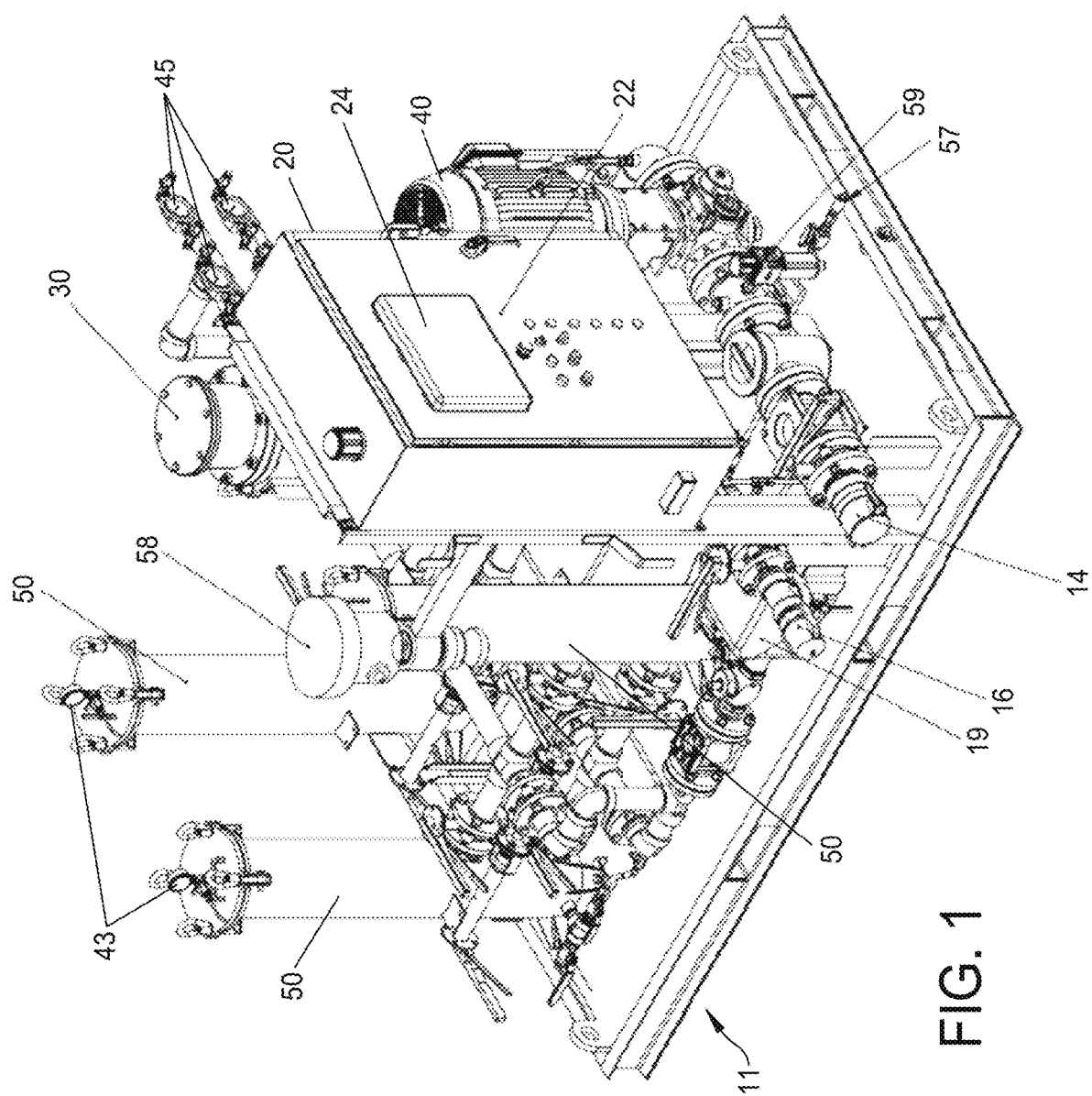
FIGS. 1-3 illustrate front perspective, rear perspective, and top plan views of one embodiment of a integrated filtration system for filtering lubricants to meet a target ISO cleanliness code specification.

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

Various embodiments of the systems and methods described herein generally relate to filtering lubricants such as oil to meet or exceed target ISO cleanliness code specifications. In this regard, the system is designed to remove particulate contamination from a wide variety of lubricants, and may be equipped with high-efficiency Micron filter elements made from pleated micro glass media filters. In use, oil may be drawn from a system user's existing source such as a tote, tank, or truck into an inlet of the filtration system by means of a self-priming positive displacement gear pump. In the context of this disclosure, the term "user" refers to a user of the filtration system such as, for example, a cleaner, a processor, and/or a certifier of the oil product.

In one embodiment, FIGS. 1-3 and FIG. 6 illustrate front perspective, rear perspective, top plan, and block diagram views, respectively, of a portable lubricant filtration tool for filtering contaminants from a lubricant to meet target OEM (original equipment manufacturer) ISO (international standards organization) cleanliness codes. An integrated filtration system 10 may be built upon a skid 11, forming the portable lubricant filtration tool which may be transported to an end user facility. The end user facility may be any appropriate plant or site housing a tote, tank, truck or other source container 12 (FIG. 6) containing the lubricant to be filtered.

The integrated filtration system 10 may comprise an inlet port 14, an outlet port 16, and a pump 40 configured to circulate a flow of the lubricant 18 (FIG. 6) into the inlet port 14 and onto an oil heater 30 for raising the temperature of the lubricant. The oil heater may also accumulate stored heat 35 within its metallic structures (not shown) while transferring heat to the lubricant flowing through it. A series 52 of filters 50 (four shown) may receive the flow of the lubricant 18 from oil heater 30 and may then direct the flow 18 through a digital particle counter 60 and onto the outlet 16 for return to the source container 12. Digital moisture indicator 48 may be interposed between the pump 40 and the heater 30 for detecting moisture in the lubricant, which moisture may interfere with or inform the operation of the digital particle counter 60. A flow meter 19 may intercept the flow of lubricant and measure a flow rate, for example, in gallons per minute.

Continuing with FIGS. 1-3 and FIG. 6, in various embodiments, a filtration system terminal 20 may be integrated into filtration system 10 and may comprise a user interface (control panel) 22 and a programmable logic controller (PLC) 21 configured to track a plurality of outputs from the pump 40, the oil heater 30, and the digital particle counter 60. The plurality of outputs may include a pressure from one or more of a system pressure gauge 43, an inlet pressure gauge 44, and filter differential pressure (DP) gauges 45, and may also include a particle count via control line 65 reflecting a contamination level, an operating status of the pump 40 via pump control line 42, the number of lubricant passes through the system 10, a temperature of the oil heater 30 via heater control lines 32, a run time of the system 10, the flow rate from the flow meter 19, and various sensors and meters operating within the system 10. The user interface 22 may include a touchscreen 24 and may provide a mechanism for entering setup data and for monitoring and controlling filtration system 10.

Referring to FIGS. 1-4, in various embodiments, the PLC 21 may be in communication with a user interface 22 such as a touchscreen 24 that enables a user to operate and interact with the system 10 via a number of preconfigured and interactive screens 25 associated with a graphical user interface (FIGS. 8-13). The graphical user interface may be provided directly to the touchscreen 24 by the PLC 21 or it may be implemented via a software application that enables system control from a variety of remote user terminals 26 and 28, as discussed further below.

The digital particle counter 60 may include gate valve 64 and may utilize a light-blocking technique as a method for detecting a level of contamination within a sample of the lubricant. For example, the level of contamination may be a particle count. The digital particle counter 60 may be a laser particle counter having a laser as a light source. Photo detectors or a CCD (charge-coupled device) may detect a size and quantity of the contaminant particles. A particle monitor 62 may display various outputs of the digital particle counter, such as the particle count in the sample.

Figure 2:
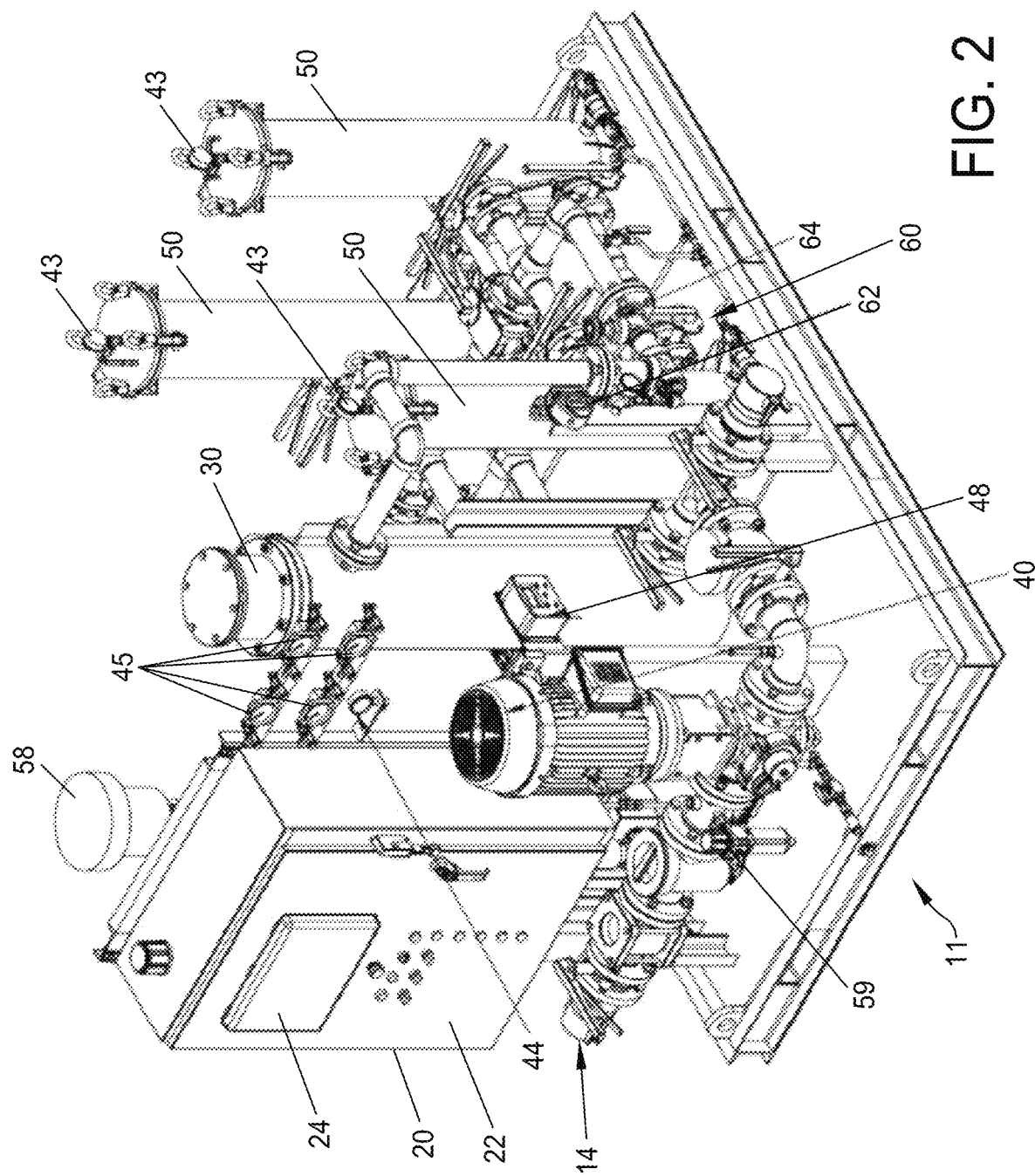
Figure 3:
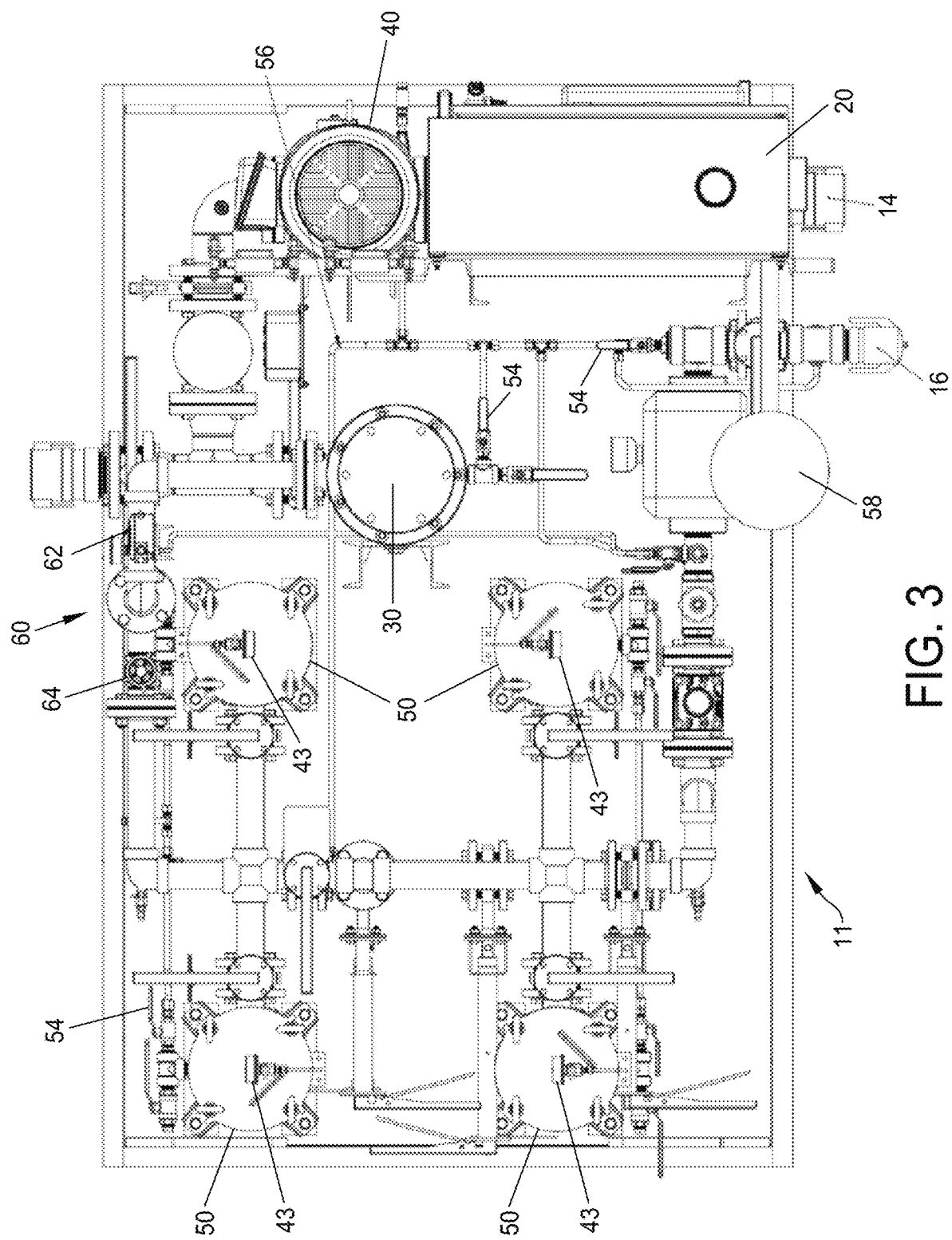

Continuing with FIGS. 1-3, in various embodiments, each of the filters 50 may be selectively sized for the flow rate and ISO cleanliness level being sought. Filter elements (not shown) within filter 50 may be of a pleated micro-glass media design. The filter housing differential pressure (DP) gauges 45 may indicate a pressure difference between an input and an output side of each filter, and thus may indicate when filter clogging necessitates replacement of the filter element. The series of filters 52 may comprise two or more Micron filters configurable in a plurality of series-parallel arrangements adjustable by configuration valves (not shown) connected to the series of filters. In the embodiment of FIGS. 1-3, four filters may be configured so that the series of filters comprises one of two filters in series, two filters in parallel, a duplex-series arrangement having a bank of two filters in parallel which is in series with a second bank of two filters in parallel, and a duplex-parallel arrangement with all four filters in parallel.

Beneficially, the oil heater 30 may provide improved filtering of the lubricant and thereby be more likely to meet an ISO cleanliness code specification. For example, the lubricant may be elevated to a temperature set point of 150° F. during the circulation. The power rating of the oil heater may be approximately 33 kW. Electrical power may be supplied through heater and monitor control lines 32, and a heavy electrical wire gauge, for example, a #6 wire gauge, may prevent wire heating, particularly during periods of inclement electrical power from the power company.

Figure 6:
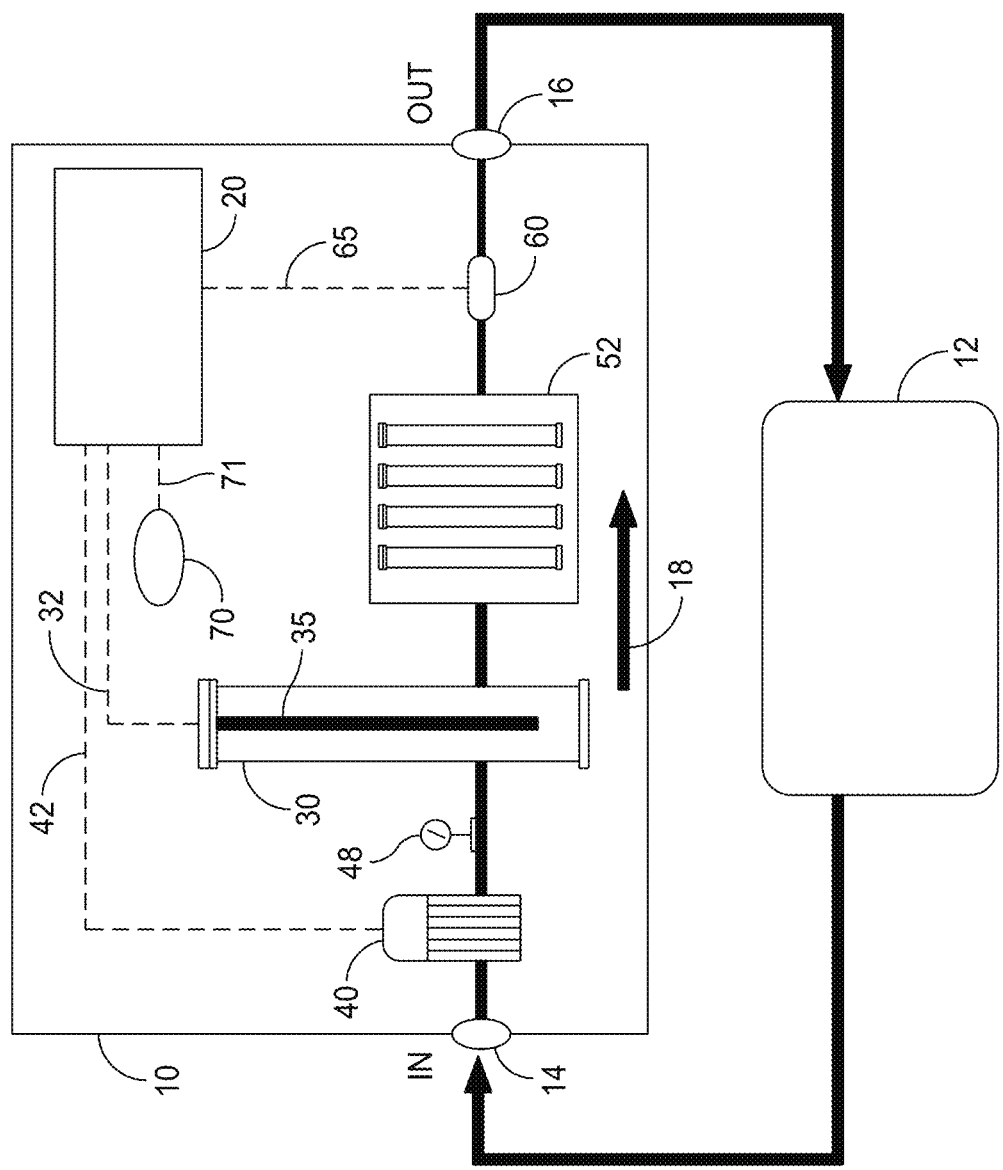
FIG. 6 provides a schematic illustrative of the control and monitoring of various components of the integrated filtration system, according to some embodiments.
Figure 7:
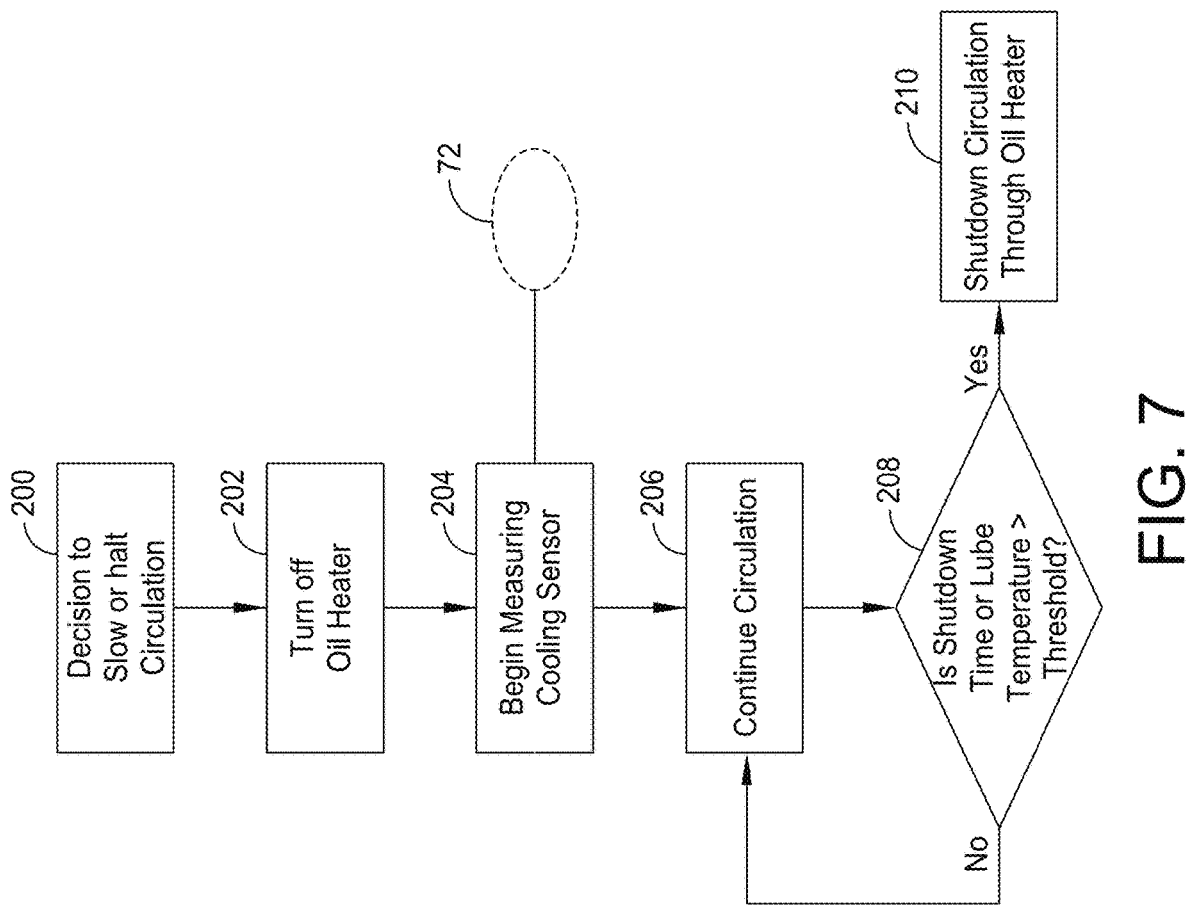
FIG. 7 provides a logic diagram illustrative of a shutdown procedure of the integrated filtration system shown in FIG. 6, according to some embodiments.

Referring to FIGS. 6-7, in an embodiment, circulation via pump 40 may occasionally need to be slowed, paused, or halted during operation of the integrated filtration system 10 in order to, for instance, for the user to evaluate data from the digital particle counter 60, or to switch to a new source container 12. In a normal shutdown procedure, both pump 40 and the heater 30 might be turned off, which could allow the stored heat 35 of heater 30 to raise the temperature of lubricant residing in the oil heater 30 to a temperature above the set point, and thus may damage the lubricant.

In order to prevent overheating of the lubricant residing in the oil heater 30, the filtration system 10 may include a delayed shutdown mechanism comprising a cooling sensor 70 and a cooling threshold 72, both associated with the oil heater 30. Initiating a delayed shutdown may include first turning off the oil heater 30 and then slowing or halting the circulation of the flow of lubricant once the cooling threshold has been crossed. Control line 71 may connect the cooling sensor 70 to the PLC 20. The cooling sensor 70 may facilitate determining when the flow of lubricant has substantially removed the stored heat 35 from the oil heater 30 after initiating the delayed shutdown mechanism, thereby preventing the damage. In one embodiment, the cooling sensor 70 may be a shutdown timer (not shown) and the cooling threshold may be a cool-down time. For example, the cool-down time may be approximately 120 seconds, and the slowing or halting of the circulation may by triggered by the shutdown timer crossing the 120 second cooling threshold 72. Alternatively, the cooling sensor 70 may be a temperature sensor connected to the integrated filtration system 10 and the cooling threshold may be a shutdown temperature.

Figure 15:
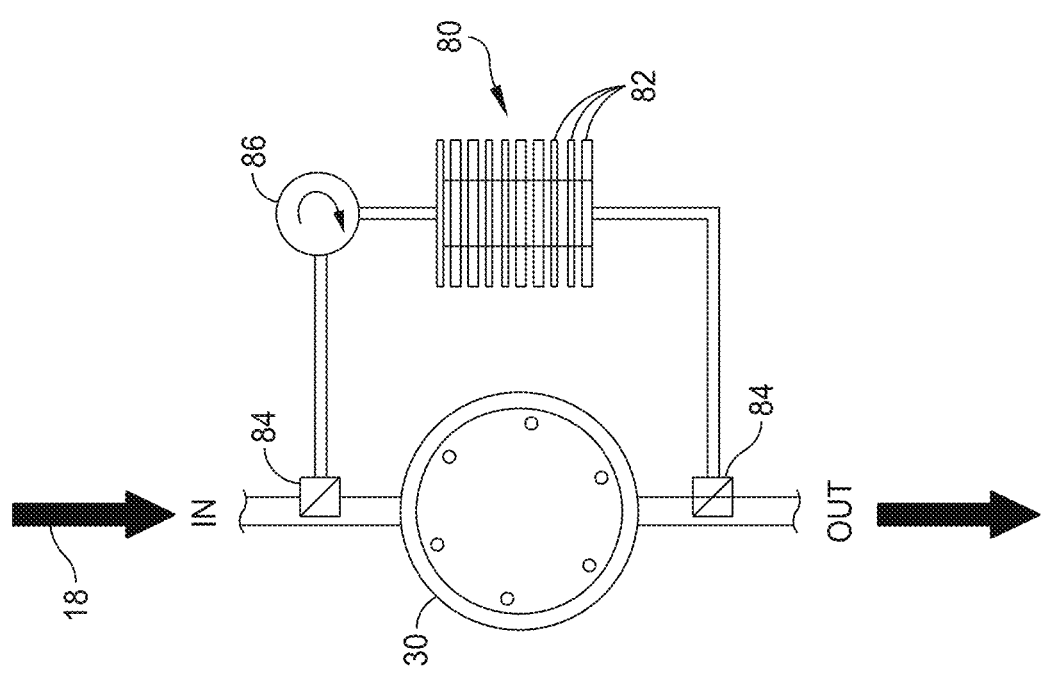
FIG. 15 illustrates components of an alternative delayed shutdown mechanism of the integrated filtration system, according to an embodiment.

Referring now to FIG. 15, in an alternate embodiment of delayed shutdown, the delayed shutdown mechanism may further comprise a cooling chamber 80 having cooling fins 82 and receivable of the flow of lubricant from the oil heater 30. In this embodiment, the main pump 40 may be turned off immediately upon initiating the delayed shutdown and allowing, for example, the user to begin a fluid change to another source container 12. The cooling chamber 80 may be configured to remove the stored heat 35 of the oil heater 30 and may be switchably connected to the oil heater 30 by cooling valves 84, with cooling fins 82 conductive or convective to an environment of the filtration system 10. Cooling pump 86 may begin circulating the lubricant between the oil heater 30 and the cooling chamber 80 once the delayed shutdown is initiated and until the cooling threshold has been crossed.

Referring again to FIGS. 1-3, in an embodiment, blow down lines 56 may intersect the path of the flow of lubricant at a plurality of locations in the integrated filtration system 10, selectable by blow down valves 54. Air pressure may be applied to air inlet/regulator 59 to force lubricant out of the system 10 and out of one or more blow down drain/ports 57 prior to processing another lubricant. Air breather 58 may provide an exit for air caught in the system during blow down. Advantageously, the blow down feature eliminates the risk of oil contamination, while also eliminating the need for a flushing fluid between filtration cycles of different products. After blow down is complete and blow down lines 56 are clear, the lubricant may be collected from outlet port 16 and/or blow down port/drain 57 and preferably returned to the lubricant's original source container 12.

Figure 4:
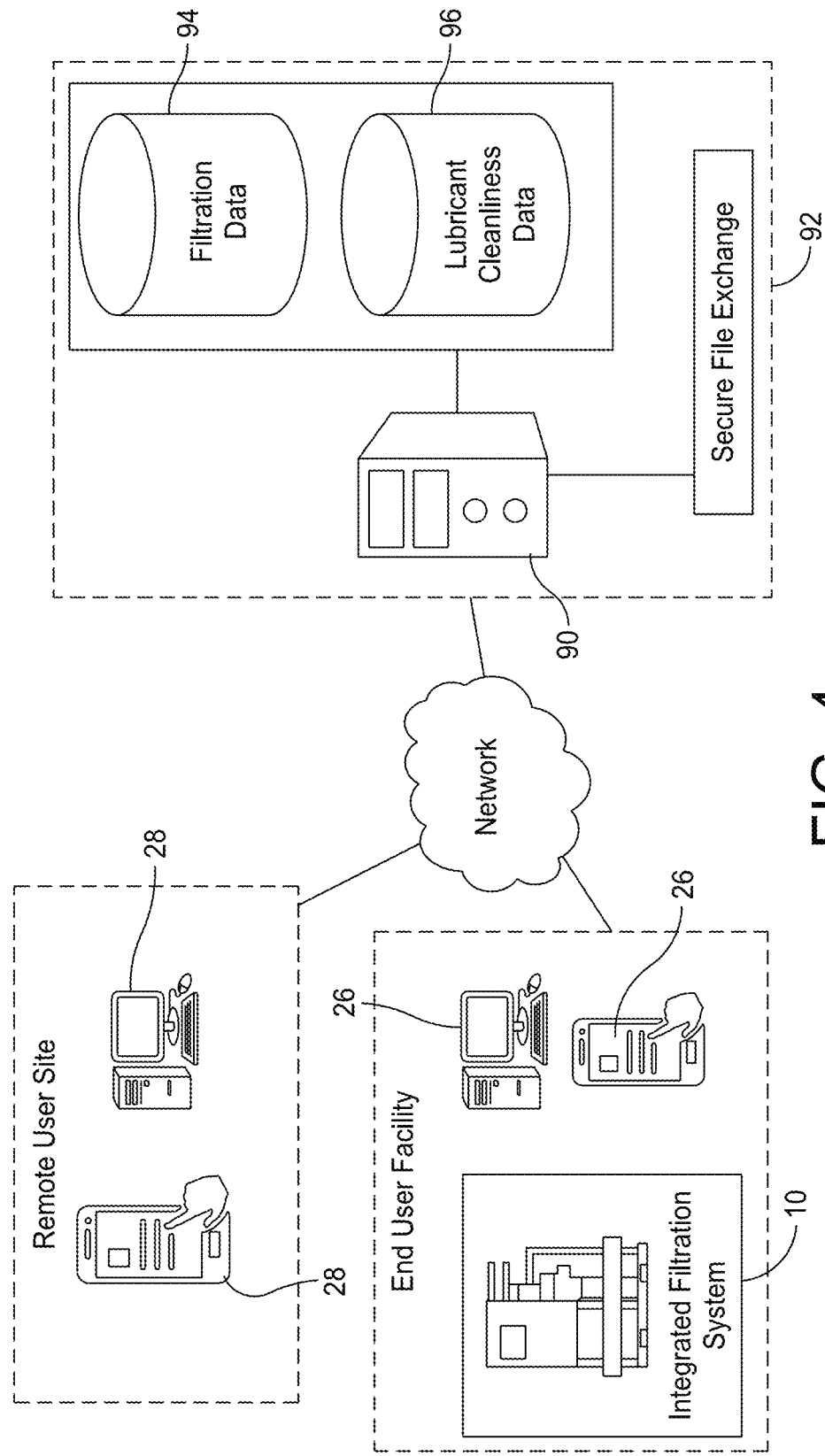
FIG. 4 depicts a block diagram of an illustrative environment and device ecosystem within which and through which various techniques associated with the integrated filtration system of FIGS. 1-3 are implemented according to some embodiments.
Figure 5:
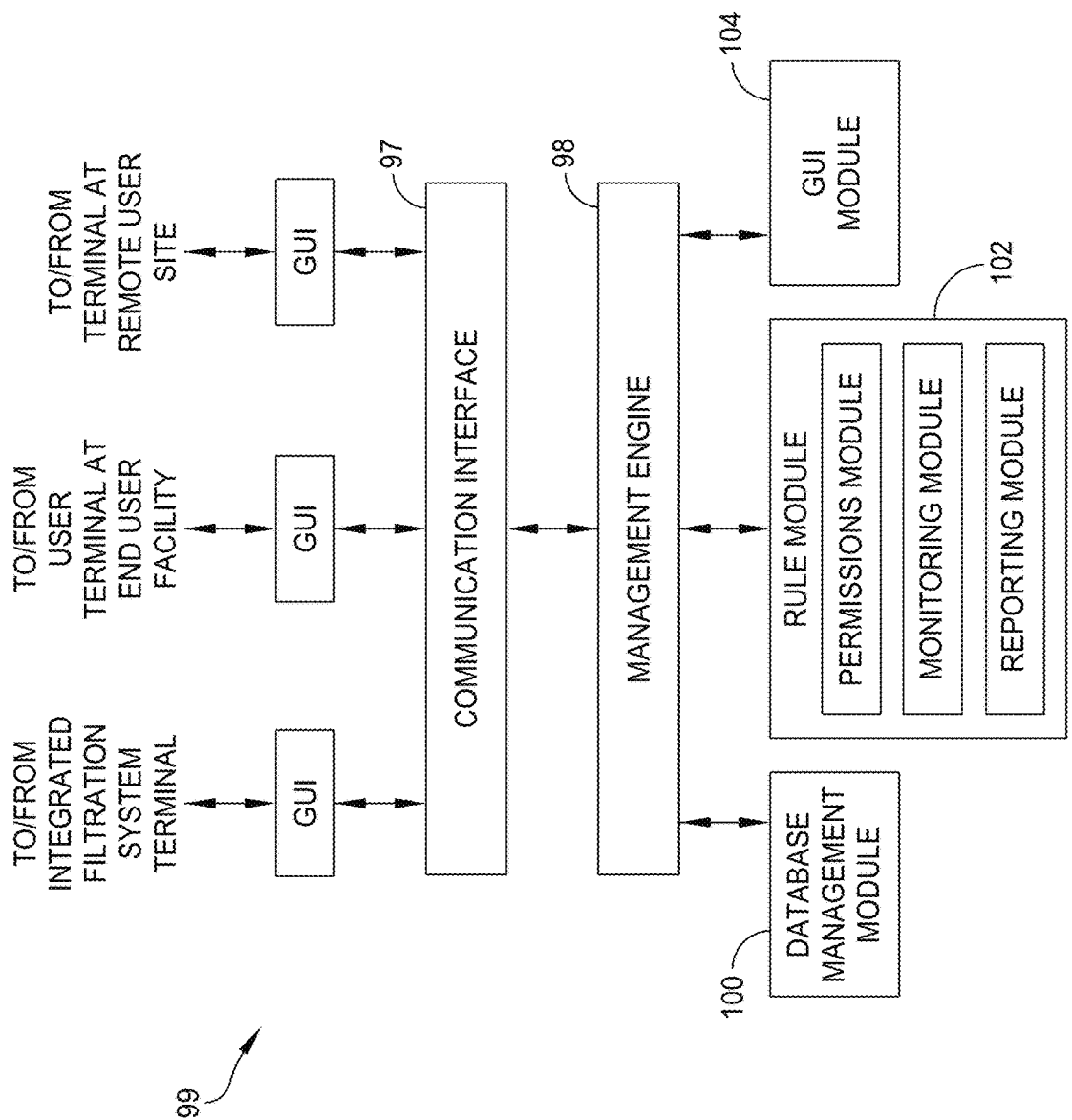
FIG. 5 provides a functional block diagram depicting illustrative lubricant filtration data tracking and monitoring software of the integrated filtration system, according to some embodiments.

Referring now to FIGS. 4-5, in various embodiments, a data logging and record keeping center 92 may comprise a filtration operations server 90 operating one or more operations processors in communication with the PLC 21, a filtration database 94 and a lubricant cleanliness database 96, and a management engine 98 running on the filtration operations server 90. The management engine 98 may implement a filtration data tracking and monitoring application 99 for controlling the integrated filtration system 10, and may communicate through a communications interface 97 and GUI to users operating one or more of the filtration system terminal 20, a facility user terminal 26, and a remote user terminal 28. The management engine 98 may be configured to perform a variety of operations related to implementing, monitoring, and logging the filtration operations occurring at the integrated filtration system 10.

The lubricant cleanliness database 96 may comprise data on a range of cleanliness categories based on one or more of a contaminant particle size, the number of particles greater than the contaminant size, and the types of contaminants discoverable in a sample of lubricant. For example, the cleanliness database 96 may comprise ISO cleanliness categories or codes based on ISO standard 4406-1999 (Method for coding the level of contamination by solid particles). The cleanliness database may describe a range of cleanliness from very clean to very dirty. Contaminants may include one or more of silica, oxidized iron and rust, fiber, and carbon.

Implementing the filtration data tracking and monitoring application 99 may comprise executing a database management module 100, a rule module 102 including one or more filtration monitoring algorithms and one or more filtration reporting algorithms, and a graphical user interface (GUI) module 104 configured to display the GUI having a plurality of preconfigured, interactive screens 25 (FIGS. 8-13) for operating one or more of the filtration system terminal 20, a facility user terminal 26, and a remote user terminal 28.

Continuing with FIGS. 4-5, the data logging and record keeping center 92 may be communicatively coupled with the user terminals 26 operating at the user facility or remote location(s) 28. In some embodiments, the data logging and record keeping center 92 may include one or more filtration operations servers 90 operating one or more filtration operations processors, as well as a secure file exchange and one or more databases, such as the filtration database 94 and the lubricant cleanliness database 96. Each of the databases may be communicatively coupled with the filtration operations server running the filtration operations processors, as shown in the schematic of FIG. 4.

The filtration database 94 and the lubricant cleanliness database 96, as well as the filtration operations server and processors 90, may be co-located at the data logging and record keeping center 92. In some embodiments, these components, or sub-components thereof, may be combined or distributed in any appropriate manner across multiple locations and/or distributed computing platforms. For example, these components, or sub-components or functionalities thereof, may be operating on the integrated filtration system 10 and/or the PLC 21 operating on the integrated filtration system 10. The portable lubricant filtration tool may further comprise a mobile application installable on a smart phone and configured to communicate with the filtration operations server for controlling and monitoring the integrated filtration system 10.

Referring to FIGS. 8-13, in various embodiments, the GUI may be displayed to system users via the GUI module 104 of FIG. 5. The GUI may be operable to display information and/or receive commands from the user(s). In various implementations, the GUI may be displayed, via a number of appropriate preconfigured and interactive screens 25, to the user at the integrated filtration system terminal 10 (i.e., the touchscreen 24), to the user at a user facility terminal 26, or to the user at a remote terminal 28. Numerous exemplary preconfigured and interactive screens 25 are shown in FIGS. 6-14 and may address setup, data entry, user notes, filtration operation, trends, batch currently in process, alarms history, and process reports. Using the preconfigured screens available through the lubricant filtration data tracking and monitoring software application, the user(s) located at any user terminal, whether on board the integrated filtration system or remote to the integrated filtration system, may operate the system, monitor operations, and review reports relating to operations.

Figure 8:
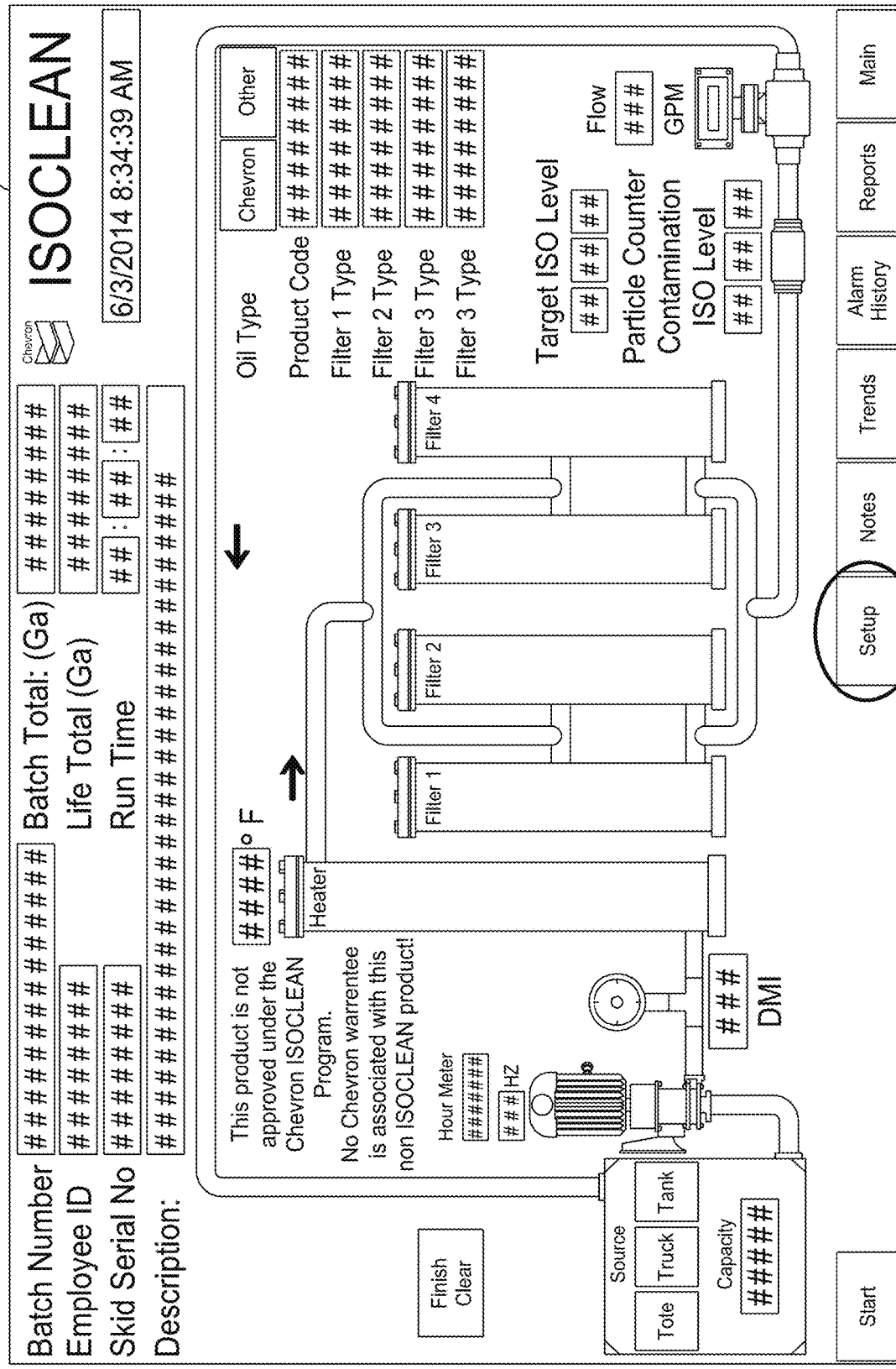
Figure 10:
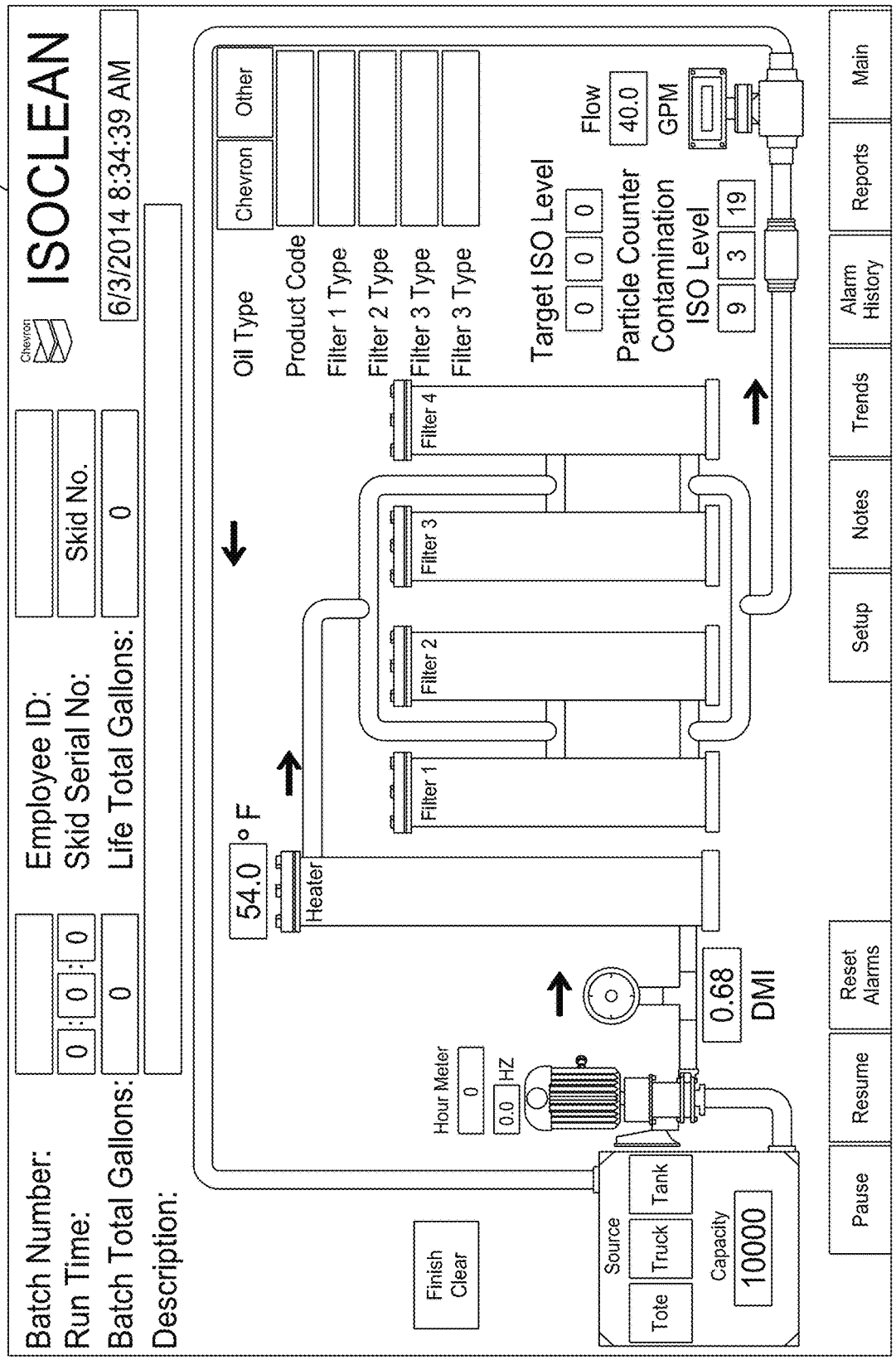
FIG. 10 presents an interactive and preconfigured run screen as displayed by the graphical user interface (GUI) module of the data tracking and monitoring software of FIG. 5, in an embodiment.

In various embodiments, FIGS. 8-9 illustrate interactive screens 25 that may be used for prompting data entry such as batch number, filter type, capacity of the source lubricant, and a target ISO cleanliness level. The user may set a time and date for an upcoming run of the integrated filtration system prior to returning to the main screen (button at lower right). Referring to FIG. 10, a run screen may be displayed by the data tracking and monitoring application 99 to track one or more of the particle contamination ISO level, the flow rate, moisture content, and temperature.

Figure 11:
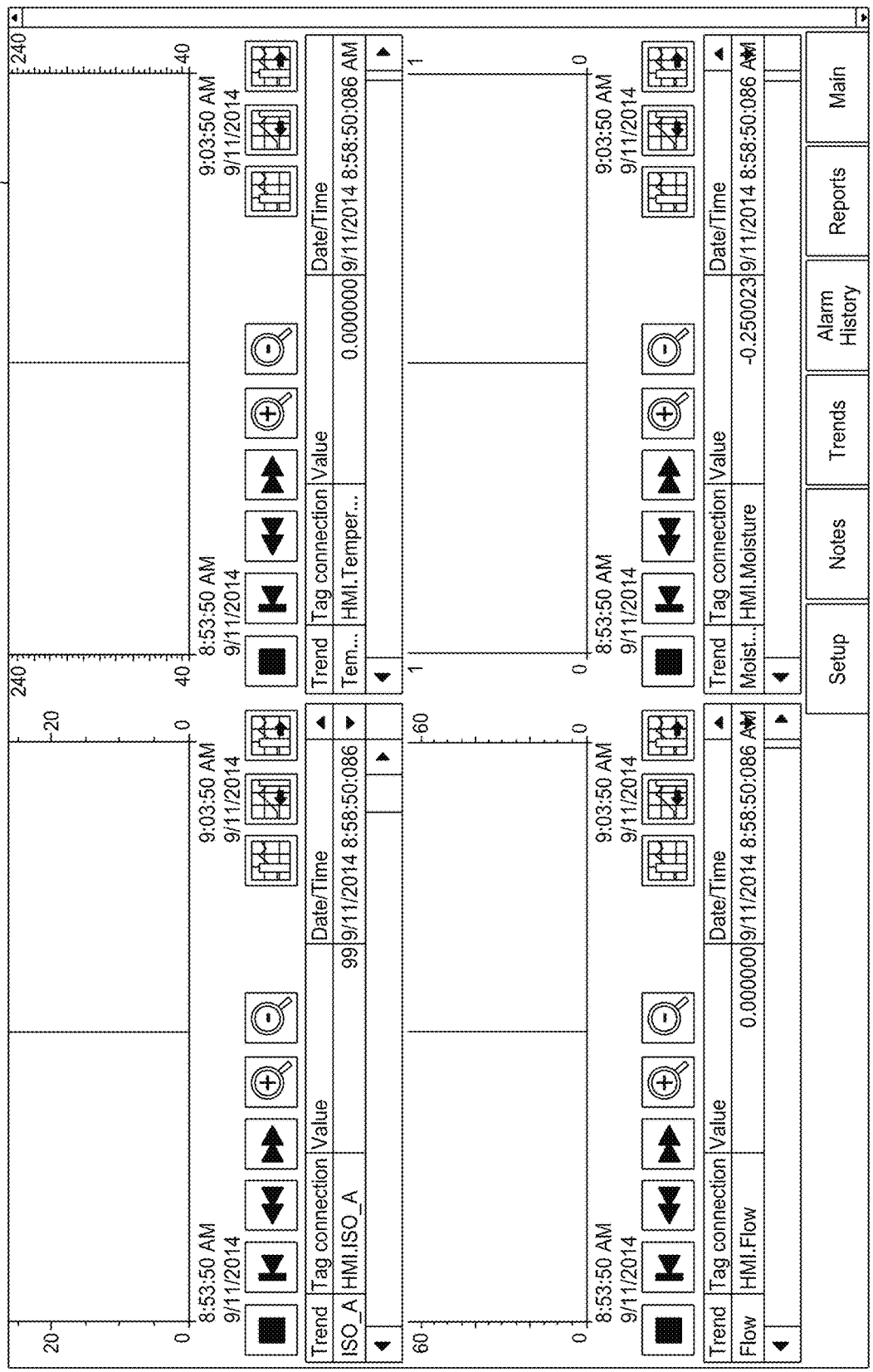
Figure 12:
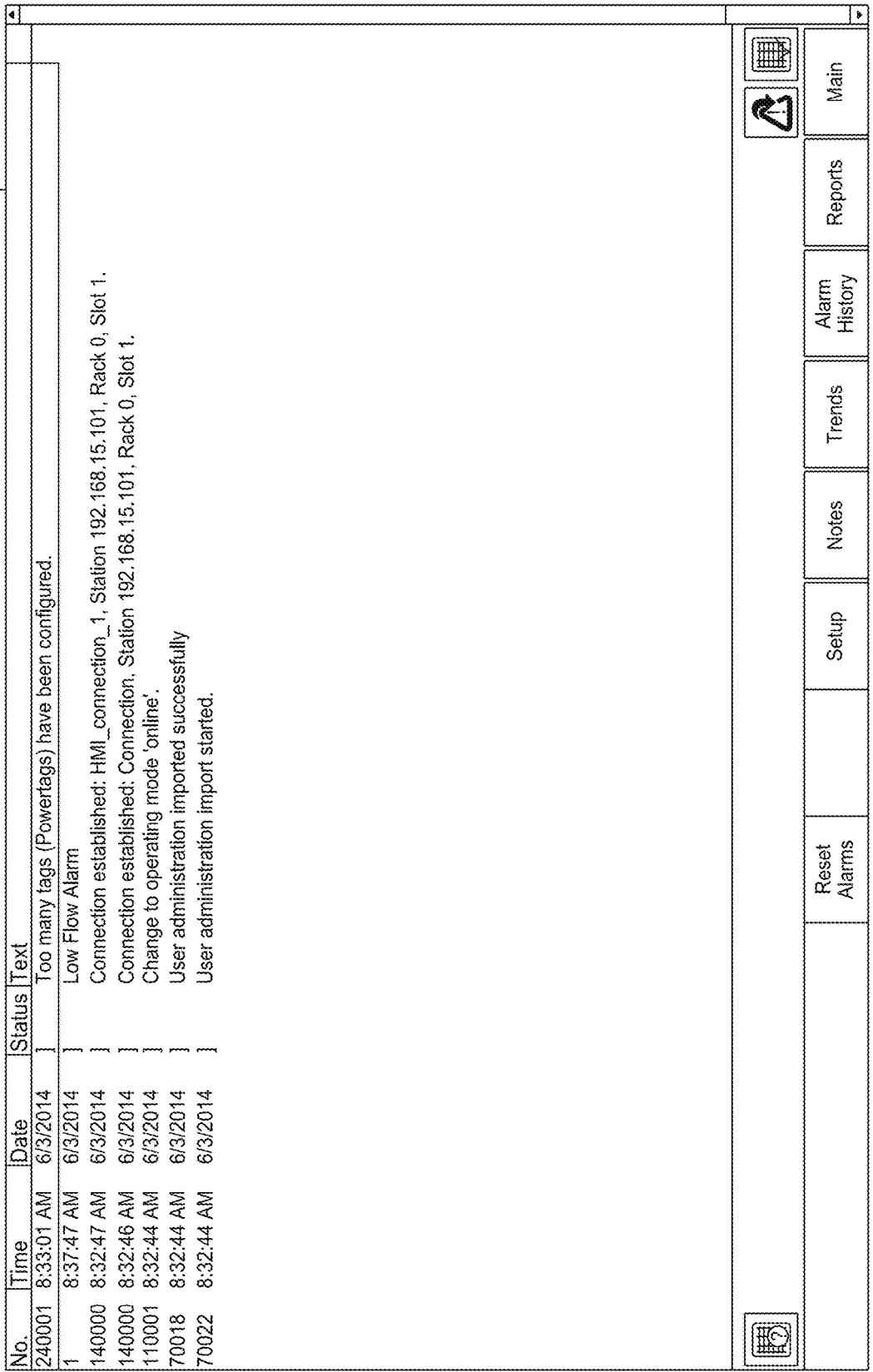
Figure 13:
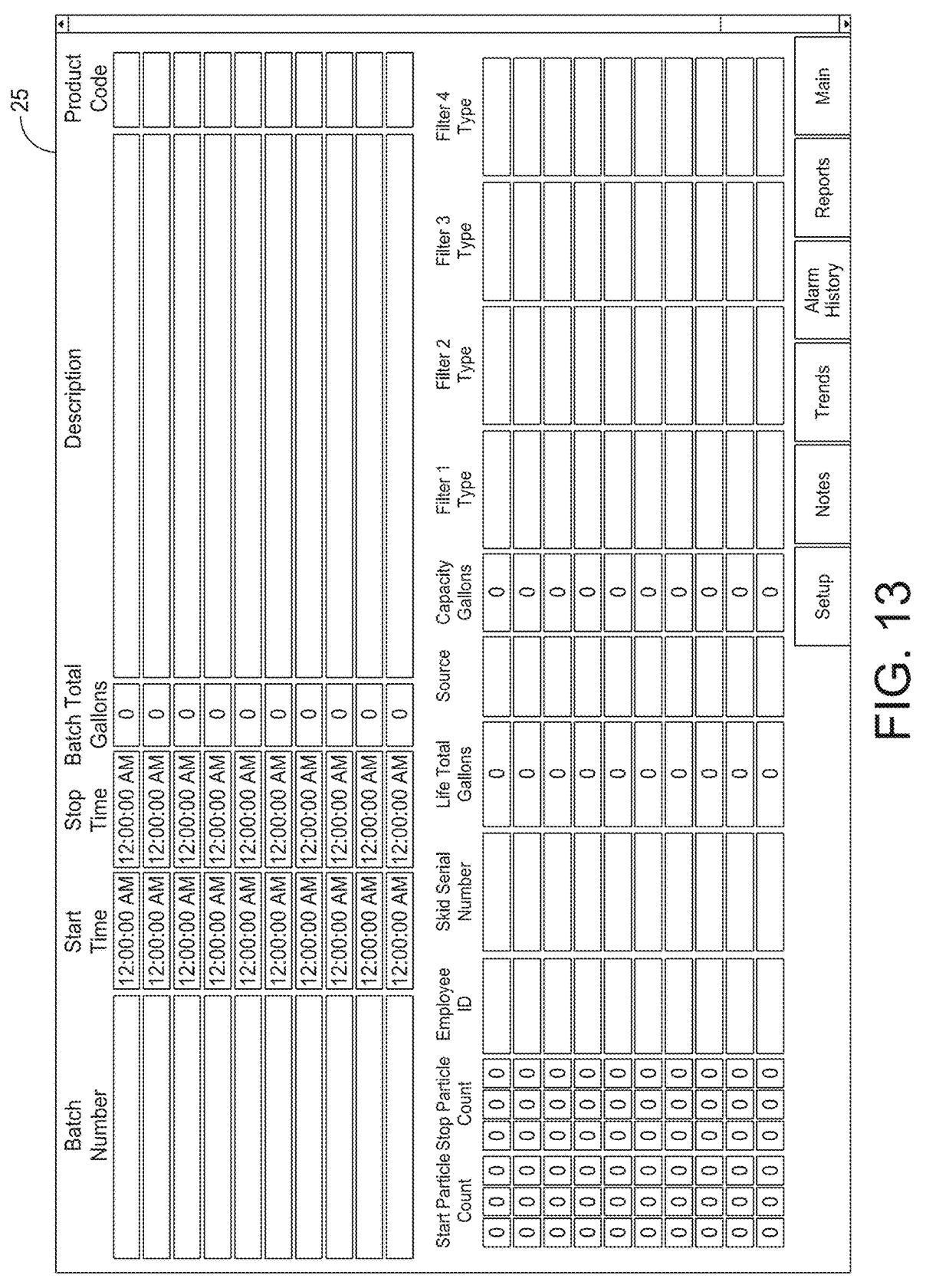

In FIG. 11, trends may be displayed for the batch in process, and may include one or more of an ISO code, temperature, flow, and moisture content. In FIG. 12, an alarm history may be displayed for the batch in process by pushing the "Alarms" soft key. Alternatively, the user may access alarms history for previously run batches using the touchscreen, a facility user terminal, or a remote user terminal or mobile application. Referring to FIG. 13, in an embodiment, historical reports may be accessed for any completed batch, and may be accessed by pushing the "Reports" soft key.

Throughout the circulation of the oil through the system 10, the configured PLC 21, in conjunction with a data logging and record keeping center 92, may monitor the various system sensors, meters, and gauges and store the plurality of outputs such as the particle count, the number of passes through the series of filters, water content, and lubricant or oil temperature. Particle count data collected from the digital particle counter 60 may automatically be compared with the target ISO cleanliness code and used as part of a feedback loop to determine whether another pass through the series of filters 52 is necessary. The circulation through the series of filters 52, the particle count measurement, and the comparison against the target ISO cleanliness code may continue iteratively until the lubricant exiting the filters 52 meets the cleanliness target, after which the flow of the lubricant may be pumped out of the outlet port 16 into its original container 12. After the filtration cycle is complete, the system may be cleaned using the blow down feature, which renders the system 10 ready to filter a different product.

Throughout the filtration process, the user may control and interact with the system via the number of interactive and preconfigured screens presented at the control panel 22, the facility terminal 26, or the remote terminal 28, including smart phone terminal 28. The filtration variables, and other operation information, may be downloaded directly to an external storage device or exported to an external storage device via a network channel such as a WiFi network. Filtration variables and operations information may also be accessed, and the integrated filtration system 10 controlled from one or more remote terminals via the filtration application 99.

In some embodiments, the integrated filtration system 10 discussed above may be incorporated into a larger filtration system that enables remote control and monitoring of the integrated filtration system via the data logging and record keeping center 92. For example, FIG. 4 depicts a block diagram of an illustrative environment and device ecosystem within which and through which various techniques described herein may be implemented according to some embodiments. As shown, components operating at the user facility, including the integrated filtration system 10, its associated PLC, and one or more user terminals, as well as user terminals operating at one or more remote user sites, may be connected with a filtration data logging and record keeping center via a network of secure communication channels. In some embodiments, each user may operate a network-enabled terminal configured to securely compile and transmit information to and from other system components. Each of the user terminals may be any appropriate network-enabled mobile or desktop user device such as, for example, a desktop computer, laptop computer, tablet computer, smartphone, or the like. The user terminal may also comprise the PLC and the user interface/touchscreen incorporated into the integrated filtration system operating to filter the oil at the end user facility.

Each of the user terminals may incorporate or access a communication system that provides network communication abilities. An exemplary communication system may include one or more analog switches, servers, IP gateways, PBX systems, etc. For example, in some embodiments, the communication system may be operable to provide communications through the network, which may include, for example, the Internet. Additionally or alternatively, the network may include wireless cellular networks or the like.

The databases 94 and 96 may include any suitable type of application or data structure that may be configured as a data repository. For example, the databases may be configured as relational databases that include one or more tables of columns and rows that may be searched or queried according to a query language, such as a version of Structured Query Language (SQL). Alternatively, the databases may be configured as structured data stores that include data records formatted according to a markup language, such as a version of Extensible Markup Language (XML). In other embodiments, the databases may be implemented using arbitrarily or minimally structured data files managed and accessible through any suitable type of application.

The communication interface 97 may enable the filtration data tracking and monitoring application 99 to securely exchange information with other systems and/or system components via the network, including the filtration system terminal 20 (e.g., the PLC 21 and touchscreen 24), one or more terminals operating at the user facility (e.g., a site manager's desktop computer or tablet computer), and one or more off-site terminals (e.g., a manager's smartphone operating at his or her home). In some embodiments, the communication interface may be configured to transmit and/or receive information using secure socket layer (SSL) encryption. Additionally or alternatively, other connections may also be used, such as, for example, XML file transmission utilizing file transfer protocol (FTP), hypertext transfer protocol (HTTP) POST transactions, or other data transmission protocols. The communication interface may further include any of a variety of standardized application programming interfaces (APIs) configured to allow different software programs to communicate (e.g., to request services and respond to such requests) in an autonomous, web-based, and/or platform-independent manner. For example, the PLC of the integrated filtration system terminal may be operated to expose certain data (e.g., run times, particle counts, system pressures, etc.) via a web interface. The communication interface may then access the exposed data and/or functions via the appropriate API(s).

The database management module 100 may include any suitable database management system (DBMS) or application configured to manage the creation, maintenance, and use of the stored data/databases of FIG. 4. The rule module 102 may include one or more sets of rules, in any suitable format, that provide a framework for administering the monitoring and reporting of the functions and processes occurring at the integrated filtration system. For example, the rule module 102 may include a permissions module that instructs connectivity and privacy across the various user terminals, including permissions defined at the role, group, and/or user levels to determine system access to various system software modules and content. The rule module may also include a monitoring module including instructions pertaining to various sensors, meters, and/or gauges on board the integrated filtration system 10 and their readings, either accessed directly or via the PLC 21. The rule module 102 may also include a reporting module including instructions pertaining to reporting on filtration processes, operations, warnings, notices, end filtration results, and so on.

The GUI module 104 may be configured to provide, for example, a web-based user interface (WUI) that implements JAVA®, AJAX®, ADOBE FLEX®, MICROSOFT.NET®, or similar technologies to provide real-time user control from any appropriate terminal. In other embodiments, the GUI module 104 may implement a command line interface, an application interface, or another suitable interface using non-web-based technologies.

A browser or application window displayed on any of the user terminals may be configured to display text content, image content, input features, navigable links, etc. of the preconfigured screens 25 of the GUI. Each preconfigured screen may include any appropriate type of content in various combinations, and the screen(s) displayed to the users may be specific to the viewing platform. For example, the screen(s) presented at the integrated filtration system terminal may differ from the screen(s) shown at the on-site user terminal, which may differ from the screen(s) shown at the offsite user terminal, etc., depending on a variety of factors including, for example, the type of information to be collected or transmitted, security concerns, user permissions, screen size, and so on.

GUI screen content may be interspersed or combined in any suitable fashion according to the capabilities of the browser and language used to implement the GUI, and may be displayed in any suitable area of the browser or application window. In some embodiments, the window may be generated and managed by a web browser such as, for example, MICROSOFT EXPLORER®, FIREFOX®, SAFARI®, CHROME®, etc., implemented from the data logging and record keeping center.

In various embodiments, the modules shown in FIG. 5 may represent sets of software routines, logic functions, and/or data structures that are configured to perform specified operations. Although these modules are shown as distinct logical blocks, in other embodiments, at least some of the functionality provided by these modules may be combined into fewer blocks or parceled into additional blocks. Conversely, any given one of the modules may be implemented such that its functionality is divided among two or more logical blocks. Moreover, although shown with a particular configuration, in other embodiments these various modules may be rearranged in other suitable ways.

The various systems and components shown in FIGS. 1-15 enable the implementation of the lubricant filtration operations at the integrated filtration system 10, including (1) system setup; (2) initiation of a filtration process; (3) monitoring or the filtration process; (4) completion of the filtration process, including responding to alarms or issues during the process; and (5) reporting on the filtration results to reflect filtration success and that the target ISO cleanliness code has been met.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:
1. A portable lubricant filtration tool, comprising:
an integrated filtration system mounted upon a skid, the integrated filtration system comprising:
  an inlet port;
  an outlet port;
  a pump configured to circulate a flow of lubricant into the inlet port, through an oil heater, through a series of filters, in view of a digital particle counter, and out of the outlet port, wherein the oil heater accumulates stored heat during the circulation;
a filtration system terminal comprising a user interface and a programmable logic controller (PLC) configured to track a plurality of outputs from the pump, the oil heater, and the digital particle counter;
a data logging and record keeping system, comprising:
  a filtration operations server operating one or more operations processors in communication with the PLC;
  a filtration database and a lubricant cleanliness database; and
  a management engine running on the filtration operations server, the management engine implement- ing a filtration data tracking and monitoring application for controlling the integrated filtration system;

a delayed shutdown mechanism for protecting the lubricant residing in the oil heater from heat damage and comprising a cooling sensor and a cooling threshold both associated with the lubricant residing in the oil heater, the cooling sensor for determining when the flow of lubricant has substantially removed the stored heat from the oil heater after initiating the delayed shutdown mechanism; and wherein initiating a delayed shutdown of the flow comprises first turning off the oil heater and then slowing or halting the circulation of the flow of lubricant based on a determination by the cooling sensor that the cooling threshold has been crossed for the lubricant residing in the oil heater.

2. The portable lubricant filtration tool of claim 1, wherein the implementing the filtration data tracking and monitoring application comprises executing a database management module, a rule module including one or more filtration monitoring algorithms and one or more filtration reporting algorithms, and a graphical user interface (GUI) module configured to display a GUI having a plurality of preconfigured, interactive screens to users operating one or more of the filtration system terminal, a facility user terminal, and a remote user terminal.

3. The portable lubricant filtration tool of claim 1, wherein the cooling sensor is a shutdown timer in the filtration operations server and where the cooling threshold is a cool-down time.

4. The portable lubricant filtration tool of claim 3, wherein the cool-down time is approximately 120 seconds.

5. The portable lubricant filtration tool of claim 1, wherein the cooling sensor is a temperature sensor connected to the integrated filtration system and where the cooling threshold is a shutdown temperature.

6. The portable lubricant filtration tool of claim 1, further comprising a cooling chamber receivable of the flow of lubricant and configured to remove the stored heat of the oil heater after the delayed shutdown mechanism is initiated.

7. The portable lubricant filtration tool of claim 6, wherein the cooling chamber is switchably connected to the oil heater and includes cooling fins conductive to an environment of the integrated filtration system.

8. The portable lubricant filtration tool of claim 1, wherein the digital particle counter is a laser particle counter.

9. The portable lubricant filtration tool of claim 1, wherein the flow of the lubricant comprises a stream of oil.

10. The portable lubricant filtration tool of claim 9, wherein each of the series of the filters is selectively sized for the stream of the oil.

11. The portable lubricant filtration tool of claim 9, wherein the plurality of the outputs comprises a particle count reflecting a contamination level of the stream of the oil.

12. The portable lubricant filtration tool of claim 1, wherein the integrated filtration system further comprises one or more blow down ports.

13. The portable lubricant filtration tool of claim 1, wherein the user interface of the integrated filtration system comprises a touchscreen.

14. The portable lubricant filtration tool of claim 1, further comprising a mobile application installable on a smart phone and configured to communicate with the filtration operations server for controlling and monitoring the integrated filtration system.

15. A method for integrative filtering of a lubricant from a source container, the method comprising:

attaching the source container to an inlet port;

pumping the lubricant from the source container into the inlet port;

heating the lubricant with an oil heater;

filtering the heated lubricant using one or more Micron filters;

counting with a digital particle counter a level of particle contamination in the filtered lubricant;

tracking the level of particle contamination and recording a number of passes through the one or more micron filters using a filtration operations server;

comparing the level of particle contamination to a lubricant cleanliness database communicating with the filtration operations server;

continuing circulating the lubricant until a lubricant cleanliness target within the cleanliness database has been achieved;

initiating a shutdown of the circulation wherein the pumping is turned off; and delaying the shutdown of the circulation by a threshold to prevent a portion of lubricant within the oil heater from overheating, the delayed shutdown comprising:

turning off electrical power to the oil heater;

sensing a lubricant temperature or a cooling time; and turning off the pump based on a determination of (1) one of the lubricant temperature within the oil heater has dropped below a threshold temperature and (2) the cooling time has exceeded a threshold time.

16. The method of claim 15 further comprising displaying a graphical representation of the level of particle contamination through one or more preconfigured, interactive GUI screens.

17. The method of claim 15 wherein the lubricant is oil.

18. The method of claim 15 wherein the threshold time is approximately 120 seconds.

19. The method of claim 15 further comprising clearing out the filtration system by pressurizing air through one or more blow down ports prior to filtering another lubricant.

20. The method of claim 15 wherein the digital particle counter is a laser particle counter.

* * * * *